(12) United States Patent
Newberg

(10) Patent No.: US 11,519,925 B2
(45) Date of Patent: Dec. 6, 2022

(54) SAFETY LIGHT CURTAIN TO DISABLE CAROUSEL ROTATION

(71) Applicant: LEICA BIOSYSTEMS IMAGING, INC., Vista, CA (US)

(72) Inventor: Nicholas Newberg, San Marcos, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 217 days.

(21) Appl. No.: 17/150,618

(22) Filed: Jan. 15, 2021

(65) Prior Publication Data

US 2021/0165004 A1 Jun. 3, 2021

Related U.S. Application Data

(63) Continuation of application No. 16/206,504, filed on Nov. 30, 2018, now Pat. No. 10,921,335.
(Continued)

(51) Int. Cl.

| | |
|---|---|
| *G01N 1/00* | (2006.01) |
| *G01N 35/02* | (2006.01) |
| *B01L 3/00* | (2006.01) |
| *F16P 3/14* | (2006.01) |
| *B01L 9/00* | (2006.01) |

(Continued)

(52) U.S. Cl.
CPC .......... *G01N 35/025* (2013.01); *B01L 3/5085* (2013.01); *B01L 9/523* (2013.01); *F16P 3/144* (2013.01); *G01N 35/00029* (2013.01); *B01L 2200/085* (2013.01); *B01L 2200/143* (2013.01); *B01L 2300/02* (2013.01); *B01L 2300/0627* (2013.01); *B01L 2300/0822* (2013.01); *B01L 2300/0841* (2013.01);
(Continued)

(58) Field of Classification Search
None
See application file for complete search history.

(56) References Cited

U.S. PATENT DOCUMENTS

| | | | |
|---|---|---|---|
| 7,140,738 B2 | 11/2006 | Guiney et al. | |
| 7,166,443 B2 | 1/2007 | Walker et al. | |

(Continued)

FOREIGN PATENT DOCUMENTS

| | | |
|---|---|---|
| CN | 202032272 U | 11/2011 |
| CN | 111279199 A | 6/2020 |

(Continued)

OTHER PUBLICATIONS

Notice of Allowance in Australian Application No. 2018375185 dated Feb. 11, 2021, in 3 pages.

(Continued)

*Primary Examiner* — Jyoti Nagpaul
(74) *Attorney, Agent, or Firm* — Frost Brown Todd LLC

(57) ABSTRACT

A digital slide scanning apparatus includes a safety light curtain that operates to disable the motor that rotates the carousel when the presence of an object (e.g., the fingers of an operator) is detected within a predetermined area of the carousel. The light curtain also operates to disable the motor that rotates the carousel when an improperly positioned glass slide or slide rack is detected. The digital slide scanning apparatus also includes a multi-color status indicator for each rack slot that indicates the rack slot location of an improperly positioned glass slide or slide rack.

20 Claims, 8 Drawing Sheets

Related U.S. Application Data

(60) Provisional application No. 62/593,111, filed on Nov. 30, 2017.

(51) Int. Cl.
*G01N 35/00* (2006.01)
*G01N 35/04* (2006.01)

(52) U.S. Cl.
CPC ............ *G01N 2035/00089* (2013.01); *G01N 2035/00138* (2013.01); *G01N 2035/0441* (2013.01)

(56) References Cited

U.S. PATENT DOCUMENTS

| | | |
|---|---|---|
| 7,300,163 B2 | 11/2007 | Scampini |
| 7,562,809 B2 | 7/2009 | Chua et al. |
| 7,628,954 B2 | 12/2009 | Gomm et al. |
| 7,859,667 B2 | 12/2010 | Scampini |
| 8,137,620 B2 | 3/2012 | Ammann et al. |
| 8,337,753 B2 | 12/2012 | Ammann et al. |
| 8,501,461 B2 | 8/2013 | Knight |
| 9,372,156 B2 | 6/2016 | Knight |
| 10,921,335 B2 | 2/2021 | Newberg |
| 2002/0059945 A1 | 5/2002 | Maiefski et al. |
| 2002/0090729 A1* | 7/2002 | Neeper ................ B01L 3/0293 436/45 |
| 2007/0003447 A1 | 1/2007 | Gleason et al. |
| 2007/0086917 A1 | 4/2007 | Lemme et al. |
| 2012/0189412 A1 | 7/2012 | Hoffmann et al. |
| 2012/0312957 A1 | 12/2012 | Loney et al. |
| 2014/0025545 A1 | 1/2014 | Carson et al. |
| 2014/0178169 A1 | 6/2014 | Hebert et al. |

FOREIGN PATENT DOCUMENTS

| | | |
|---|---|---|
| EP | 2226123 A1 | 9/2010 |
| JP | 2016-006534 A | 1/2016 |
| JP | 2021-502594 A | 1/2021 |
| WO | WO 97/014041 A1 | 4/1997 |
| WO | WO 2011/049608 A2 | 4/2011 |
| WO | WO 2017/096302 A1 | 6/2017 |
| WO | WO 2019/109020 A1 | 6/2019 |

OTHER PUBLICATIONS

Extended European Search Report for EP 18883178.8 dated May 11, 2021 in 15 pages.
Notice of Reasons for Refusal in Japanese Application No. 2020-524844 dated Jun. 28, 2021, in 10 pages.
International Search Report and Written Opinion dated Feb. 7, 2019 for App No. PCT/US2018/063450, in 7 pages.
International Preliminary Report on Patentability dated Jun. 2, 2020 for App No. PCT/US2018/063450, in 6 pages.

* cited by examiner

SAFETY LIGHT CURTAIN TO DISABLE CAROUSEL ROTATION

CROSS-REFERENCE TO RELATED APPLICATIONS

This application is a continuation of U.S. patent application Ser. No. 16/206,504, filed on Nov. 30, 2018, which claims priority to U.S. Provisional Patent App. No. 62/593,111, filed on Nov. 30, 2017, which are both hereby incorporated herein by reference as if set forth in full.

BACKGROUND

Field of the Invention

The present invention generally relates to a digital side scanning apparatus and more particularly relates to a safety light curtain that disables a rotating slide rack carousel to protect an operator and to protect glass slides.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis and prediction of cancer and other important diseases.

A digital slide scanning apparatus typically scans a single slide at a time. Some digital slide scanning apparatus have been modified to hold one or more slide racks so that the digital slide scanning apparatus can sequentially process tens or hundreds of glass slides. The use of these systems holding hundreds of glass slides creates a safety hazard for operators who much interface with the moving parts of the apparatus. The use of these systems also introduces additional risk that highly valuable glass slides may be damaged by the moving parts of the apparatus. Therefore, what is needed is a system and method that overcomes these significant problems as described above.

SUMMARY

Accordingly, described herein is digital slide scanning apparatus having a slide rack carousel that allows for continuous loading and unloading of slide racks into the carousel while the digital slide scanning apparatus is simultaneously digitizing glass slides. The housing of the digital scanning apparatus has no door, which results in at least a portion of the carousel always being accessible to an operator in order to facilitate continuous loading and eliminate additional vibration caused by a door. The carousel also includes a safety light curtain that operates to disable the motor that rotates the carousel when the presence of an object (e.g., the fingers of an operator) is detected within a predetermined area of the carousel. The light curtain also operates to disable the motor that rotates the carousel when an improperly positioned glass slide or slide rack is detected. The slide rack carousel also includes a multi-color status indicator for each rack slot that indicates the location of an improperly positioned glass slide or slide rack.

In an embodiment, a digital slide scanning apparatus includes a carousel configured to support a plurality of slide racks, a mount bracket positioned over the carousel, a plurality of transmitter and receiver pairs, wherein for each pair, one of the transmitter or receiver is connected to the mount bracket and the other of the transmitter or receiver is connected to the carousel, wherein the transmitter and receiver are communicatively coupled via a direct wireless link and wherein the transmitter and receiver pair are configured to detect the presence of an object by interruption of the direct wireless link. The apparatus also includes at least one processor configured to rotate the carousel 360 degrees, the at least one processor further configured to receive an indication from a first transmitter and receiver pair when the presence of an object is detected, and wherein the at least one processor is further configured to disable rotation of the carousel in response to the indication.

In an embodiment, a digital slide scanning apparatus includes a carousel comprising a carousel base configured to support a plurality of slide racks, the carousel base having an upper surface, a lower surface and a perimeter edge, wherein at least a portion of the upper surface of the carousel base angles downward from an external region of the carousel base toward a central region of the carousel base. The apparatus also including a plurality of rack spacers extending upward from the carousel base, wherein adjacent pairs of rack spacers define a rack slot bordered on three sides by the carousel base, a first side of a first rack spacer and a second side of a second rack spacer, a mount bracket positioned over the carousel, the mount bracket having an upper surface, a lower surface and a perimeter edge, a machine base positioned below the carousel and configured to support the carousel, and a plurality of transmitter and receiver pairs, wherein for each pair, one of the transmitter or receiver is positioned on or in the lower surface of the mount bracket proximal the perimeter edge of the mount bracket and the other of the transmitter or receiver is positioned on or in the upper surface of the machine base proximal the perimeter edge of the carousel base, wherein the transmitter and receiver are communicatively coupled via a direct wireless link and wherein the transmitter and receiver pair are configured to detect the presence of an object by interruption of the direct wireless link. The apparatus also includes a housing comprising an opening configured to expose at least a portion of the carousel for continuous loading and unloading of slide racks and at least one processor configured to rotate the carousel 360 degrees in either direction, the at least one processor further configured to receive an indication from a first transmitter and receiver pair when the presence of an object is detected, and wherein the at least one processor is further configured to disable rotation of the carousel in response to the indication.

In an embodiment, a digital slide scanning apparatus includes a carousel configured to support a plurality of slide racks, a mount bracket positioned over the carousel, and a plurality of transmitter and receiver pairs, wherein for each pair, one of the transmitter or receiver is connected to the mount bracket and the other of the transmitter or receiver is connected to the carousel, wherein the transmitter and receiver are communicatively coupled via a direct wireless link and wherein the transmitter and receiver pair are configured to detect the presence of an object by interruption of the direct wireless link. The apparatus also includes at least one processor configured to rotate the carousel 360 degrees, the at least one processor further configured to receive an indication from a first transmitter and receiver pair when the presence of an object is detected, and wherein the at least one processor is further configured to disable rotation of the carousel in response to the indication.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a safety light curtain for use in a digital slide scanning apparatus. The digital pathology scanning apparatus has a safety light curtain that detects the presence of an object within a predetermined area of the slide rack carousel and also detects improperly positioned glass slides or slide racks in the carousel. The safety light curtain operates to disable the motor that rotates the carousel when the presence of an object or an improperly positioned slide or slide rack is detected. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. EXAMPLE SLIDE RACK CAROUSEL SYSTEM

Figure 1:
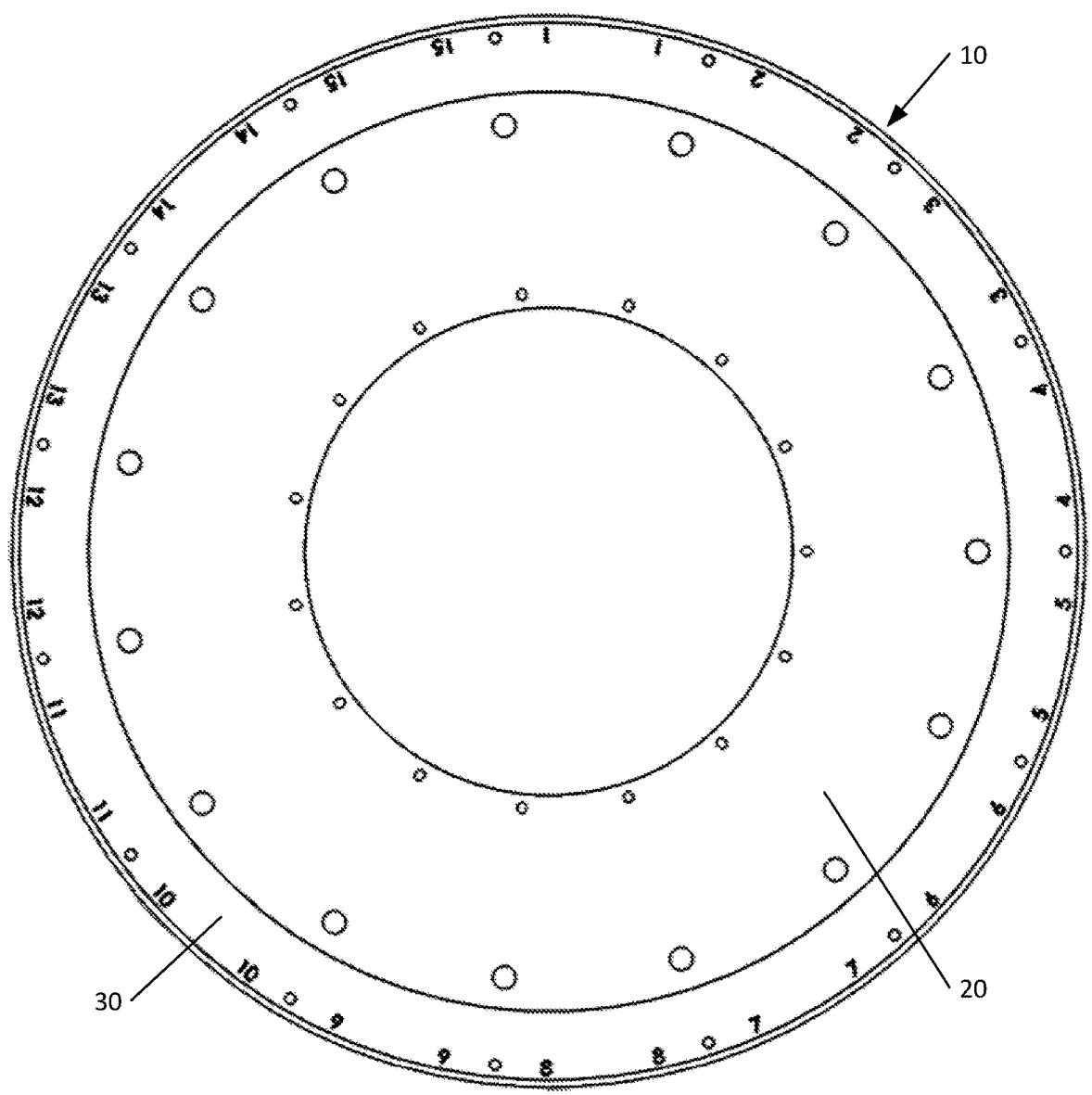
FIG. 1 is a top view diagram illustrating an example slide rack carousel base according to an embodiment.

FIG. 1 is a top view diagram illustrating an example slide rack carousel base 10 according to an embodiment. In the illustrated embodiment, the upper surface of the carousel base 10 has an angled portion 20 that is more centrally located and the upper surface of the carousel base 10 also has a flat portion 30 that is more externally located near the perimeter of the circular shaped base 10 that is in the form of a ring.

Figure 2:
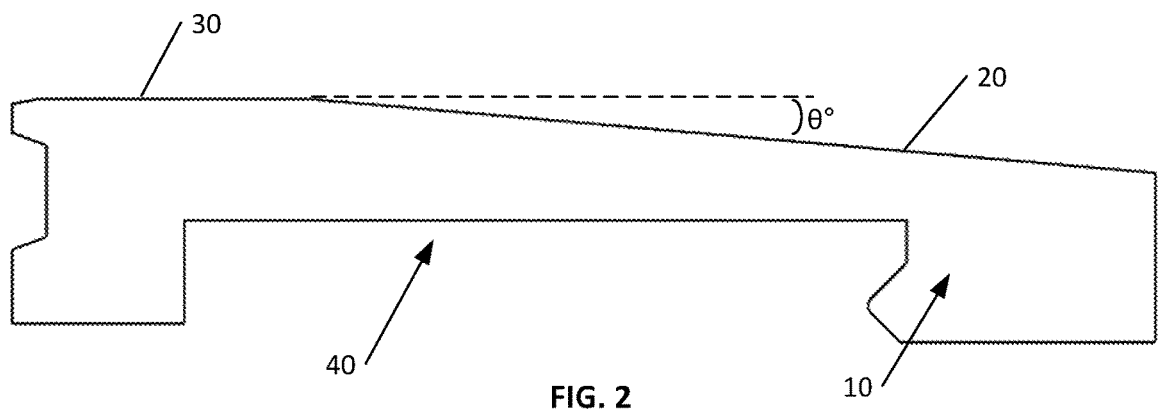
FIG. 2 is a side view diagram illustrating an example cross section of one side of a slide rack carousel base according to an embodiment.

FIG. 2 is a side view diagram illustrating an example cross section of one side of a slide rack carousel base 10 according to an embodiment. In the illustrated embodiment, a portion 30 of the upper surface of the carousel base is flat. This portion 30 of the upper surface is near the perimeter of the upper surface of the carousel base 10. Additionally, a different portion 20 of the upper surface of the carousel base is angled at an angle of θ°. Advantageously, at least a portion of the upper surface of the base 10 is angled and the degree of the angle, θ°, may range from 1° to 10°, or even higher up to 45°. As previously discussed, when a slide rack is positioned on the angled upper surface 20 of the carousel base 10, any vibration induced or other movement of the slide rack is biased toward the center of the carousel 10 where slide rack stoppers prevent further movement of the slide rack. Additionally, the individual slides in the slide rack may also experience vibration induced movement or other movement and the angled position of the slide rack in which an individual slide is disposed also positions the individual slide at an angle such that movement of the individual slide is biased toward the center of the carousel where the end of the slide rack prevents further movement of the slide rack.

Figure 3:
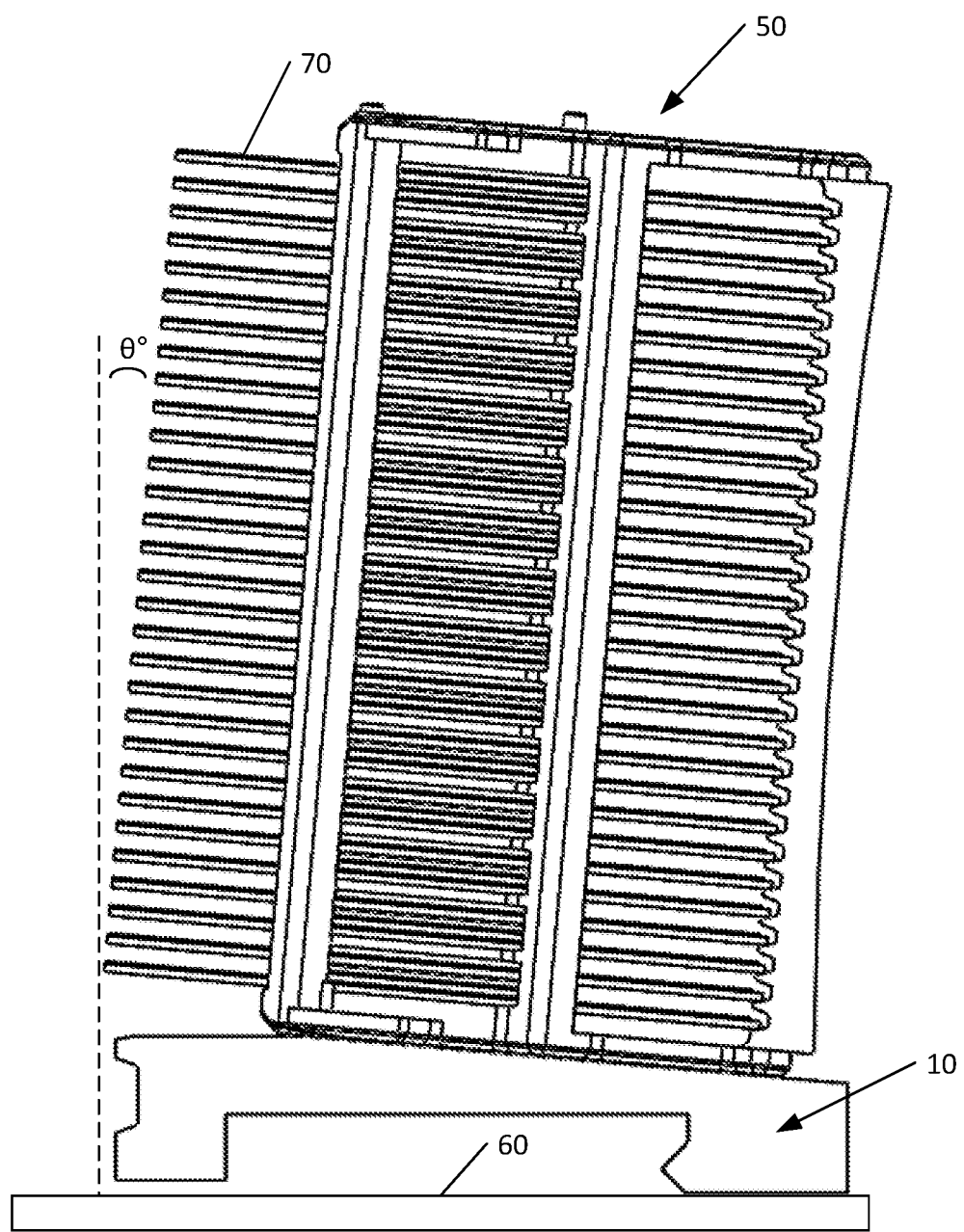
FIG. 3 is a side view diagram illustrating an example cross section of one side of a slide rack carousel with a slide rack positioned on the carousel base according to an embodiment.

FIG. 3 is a side view diagram illustrating an example cross section of one side of a slide rack carousel with a slide rack 50 positioned on the carousel base 10 according to an embodiment. In the illustrated embodiment, carousel base 10 is supported by a machine base 60 and the slide rack 50 is positioned on the angled portion 20 of the carousel base 10. The glass slides 70 extend outward from the slide rack 50 toward the perimeter edge of the carousel base 10. An advantage of this arrangement is that any vibration from the digital slide scanning apparatus imposed on the slide rack 50 or the individual glass slides 70 will advantageously bias the slides 70 for movement toward the central portion of the carousel, which is a more safe and secure position for the slide racks 50 and the glass slides 60. However, a disadvantage of the angled orientation of the slide rack 50 results in the ends of the glass slides 70 not being in vertical alignment.

2. EXAMPLE LIGHT CURTAIN SYSTEM

Figure 4A:
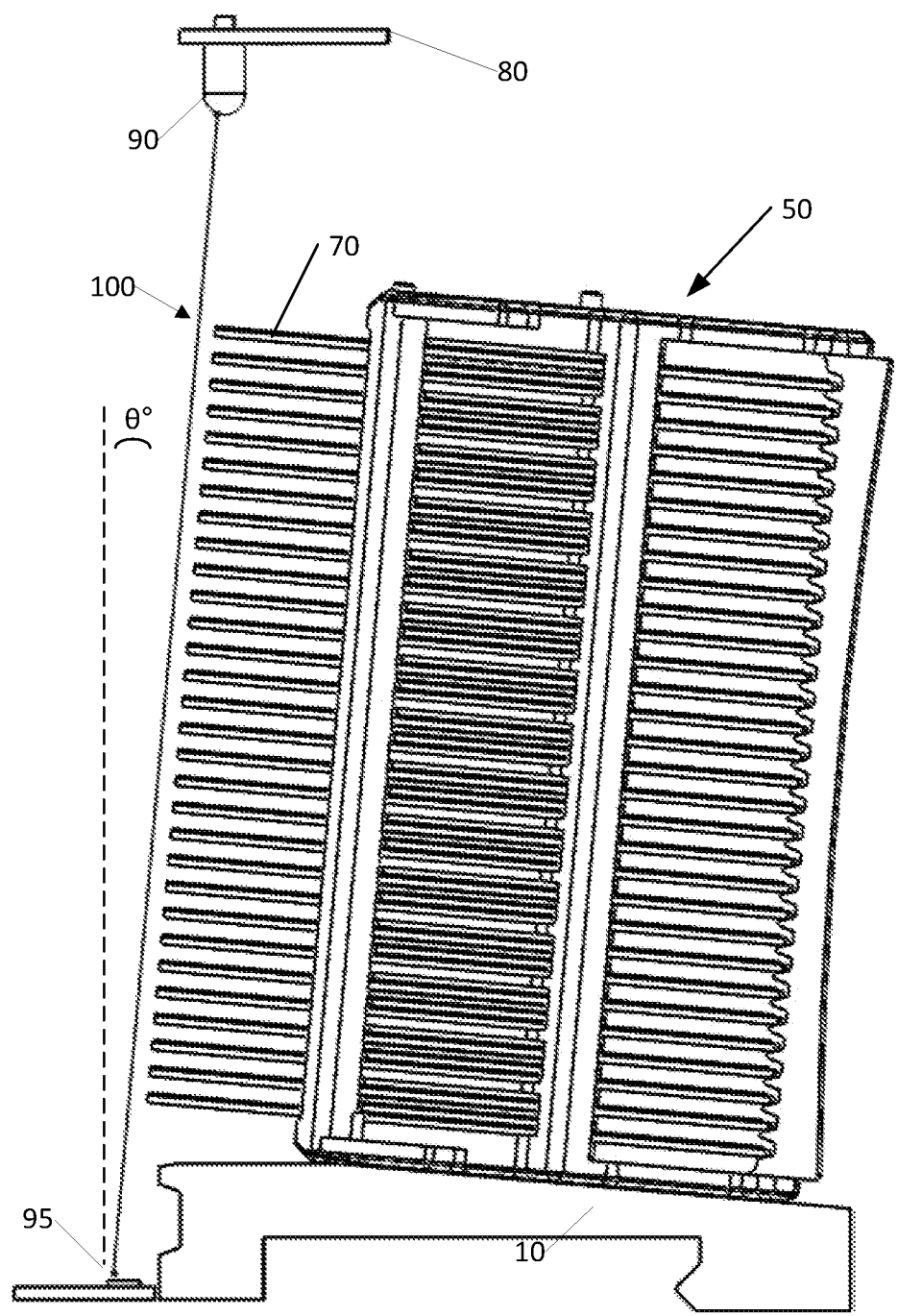
FIG. 4A is a side view diagram illustrating an example cross section of one side of a slide rack carousel with a safety light curtain according to an embodiment.

FIG. 4A is a side view diagram illustrating an example cross section of one side of a slide rack carousel with a safety light curtain 100 according to an embodiment. In the illustrated embodiment, the slide rack 50 is positioned on the angled portion 20 of the carousel base 10 and the glass slides 70 extend outward from the slide rack 50 toward the perimeter edge of the carousel base 10. The ends of the glass slides 70 are not in vertical alignment.

The digital pathology scanning apparatus additionally includes a mount bracket 80 that is positioned above the slide rack carousel and above any slide racks 50 that are positioned on the carousel base 10. The mount bracket 80 has an upper surface, a lower surface and a perimeter edge. In one embodiment, the mount bracket 80 is in the form of a ring, similar to the carousel base 10. The mount bracket 80 may include a printed circuit board or other electronics that are connected to one portion 90 of a transmitter/receiver pair that is positioned on or in the mount bracket 80 near the perimeter edge of the mount bracket 80.

The other portion 95 of the transmitter/receiver pair is positioned on or in the machine base 60 upon which the carousel is supported. Similarly, the machine base 60 may include a printed circuit board or other electronics that are connected to the other portion 95 of the transmitter/receiver pair that is positioned on or in the machine base 60 near the perimeter edge of the carousel base 10. The two portions 90, 95 of the transmitter and receiver pair are communicatively coupled via a direct wireless link. Advantageously, the transmitter and receiver pair is configured to detect the presence of an object by interruption of the direct wireless link. In one embodiment, the transmitter and receiver pair is monitored by at least one processor of the digital slide scanning apparatus such that interruption of the direct wireless link between the two portions of the transmitter and receiver pair results in an indication to the at least one processor that an object has been detected. When such an indication is present, the at least one processor is configured to disable rotation of the carousel. In one embodiment, the processor may be configured to employ a hard disable (e.g., an immediate stop) or a soft disable (e.g., complete the movement to the next position). The hard or soft disable may be employed to protect against a pinch point hazard. For example, a hard disable may be employed if an object is detected within a certain distance of an edge of the housing that defines the opening through which the slide rack carousel is accessed by an operator. In one embodiment, a threshold distance may be in the range of 0-20 millimeters from the edge of the housing. In one embodiment, the threshold distance is 11 millimeters. Additionally, when such an indication is not present, the at least one processor is configured to enable rotation of the carousel.

In one embodiment, the two portions of the transmitter and receiver pair are vertically aligned. In another embodiment, the two portions of the transmitter and receiver pair are not vertically aligned and are instead positioned at an angle to each other. For example, the two portions of the transmitter and receiver pair may be offset at an angle that is equal to the angle, θ°, that is equal to the angle of the upper surface of the base. Advantageously, because the slide rack is positioned on the angled upper surface of the base, the ends the glass slides in the rack form a plane at a right angle to the upper surface of the base. Accordingly, when the alignment of the transmitter and receiver are offset from vertical and in the above described plane, the resulting safety light curtain is substantially the same distance from the end of each glass slide in the slide rack. Accordingly, the safety light curtain is tightly constrained to the different vertical positions of the end of each glass slide in the slide rack.

In an embodiment, the transmitter of the transmitter a receive pair is configured to pulse at a particular frequency and the receiver of the transmitter a receive pair is configured to receive at the same frequency, e.g., 40 khz. Advantageously, configuring the receiver to detect the pulsed output from the transmitter at the predetermined frequency ensures that external light sources do not cause a false positive detection.

Figure 4B:
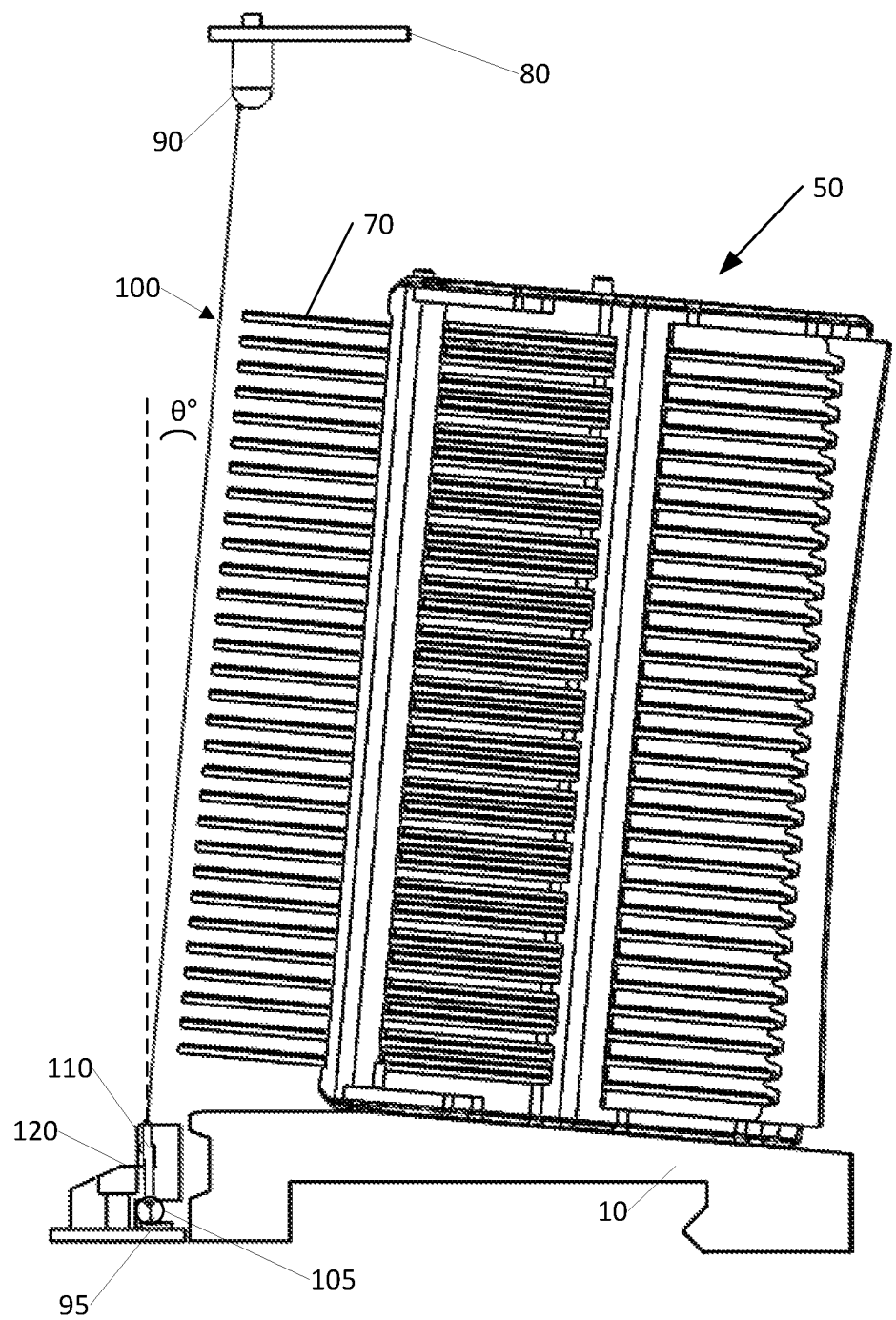
FIG. 4B is a side view diagram illustrating an example cross section of one side of a slide rack carousel with a safety light curtain and a riser apparatus according to an embodiment.

FIG. 4B is a side view diagram illustrating an example cross section of one side of a slide rack carousel with a safety light curtain 100 according to an embodiment. In the illustrated embodiment, a riser apparatus 120 is positioned on or near the carousel base 10 or machine base 60 and extends upward from the portion of the transmitter/receiver pair that is positioned near the carousel base 10 or machine base 60. The riser apparatus 120 is configured to position a focusing means 110 relative to the portion of the transmitter/receiver pair that is positioned near the carousel base 10 or machine base 60 so that the pulsed output from the portion of the transmitter/receiver pair that is positioned near mount 80 is focused on the portion of the transmitter/receiver pair that is positioned near the carousel base 10 or machine base 60. The focusing means 110 may be any type of focusing means such as a lens, aperture, or light guide, just to name a few. Other focusing means 110 may also be employed. As will be understood by the skilled artisan, one or more focusing means 110 may be used in connection with each of the transmitter and/or receiver of the transmitter/receiver pair. Using the focusing means 110 advantageously facilitates improved detection of detailed objects such as glass slides 70 or fingers of an operator.

Figure 4C:
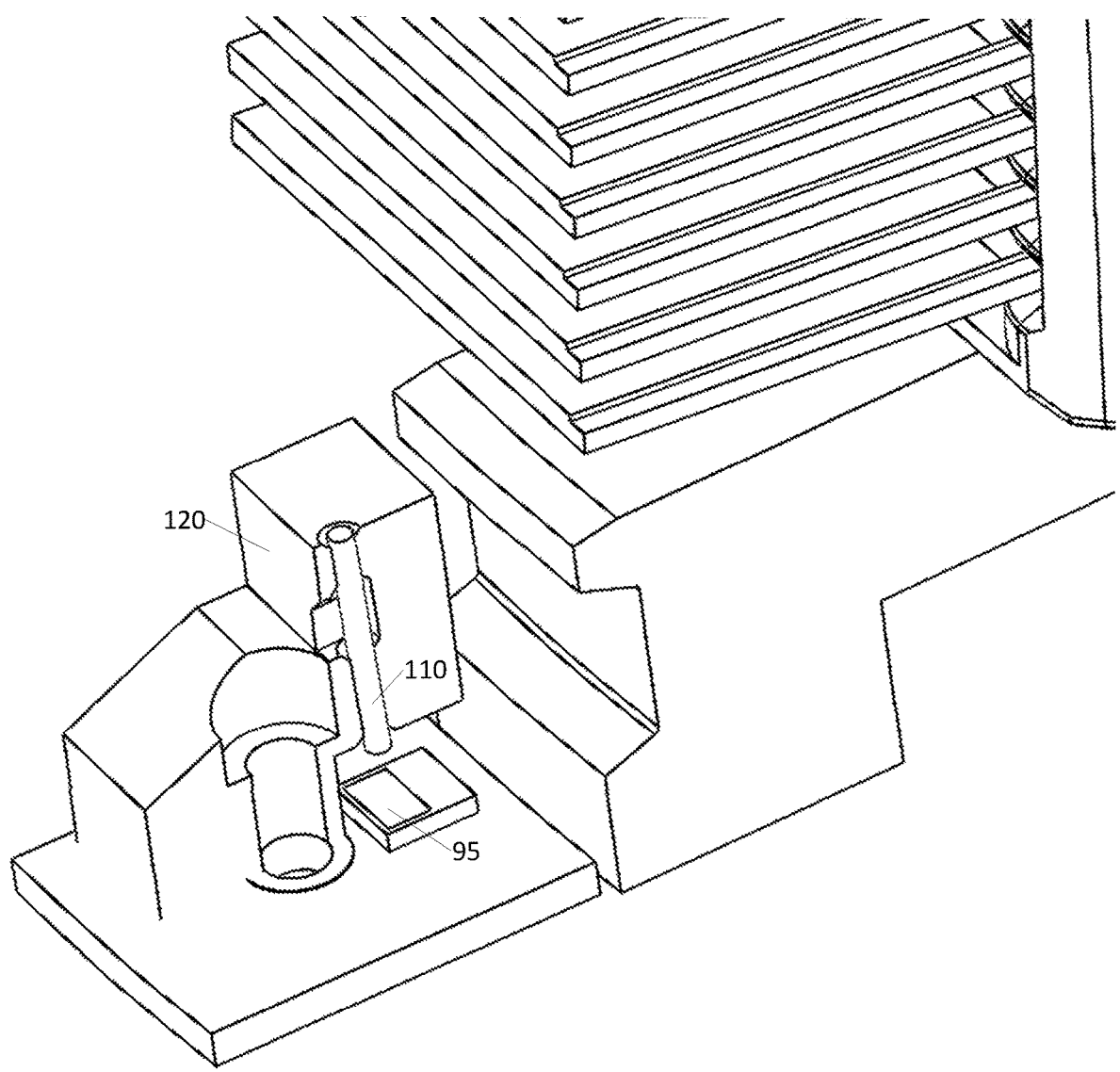
FIG. 4C is a perspective view diagram illustrating an example transmitter/emitter with a light focusing means according to an embodiment.

FIG. 4C is a perspective view diagram illustrating an example transmitter/receiver 95 with a light focusing means 110 according to an embodiment. In the illustrated embodiment, the light focusing means 110 is a light guide that is positioned by the riser apparatus 120 to receive pulsed output from the transmitter 95 or to guide pulsed output to the receiver 95, depending on the function of element 95 in the transmitter/receiver pair.

Figure 5:
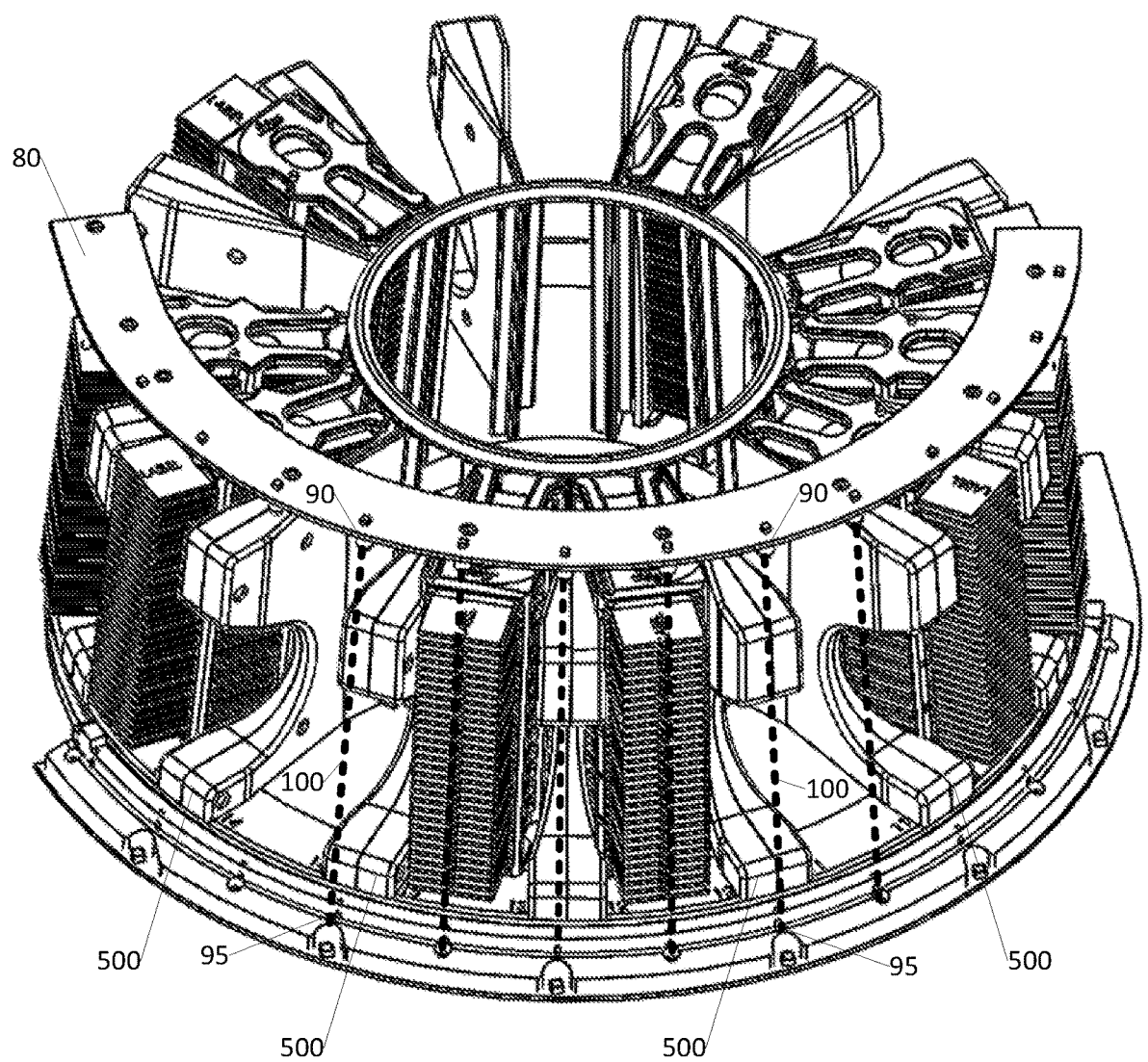
FIG. 5 is a perspective view diagram illustrating an example digital pathology scanning apparatus with a safety light curtain protecting a slide rack carousel according to an embodiment.

FIG. 5 is a perspective view diagram illustrating an example digital pathology scanning apparatus with a safety light curtain 100 protecting a slide rack carousel according to an embodiment. In the illustrated embodiment, the carousel is supported by a machine base. The carousel comprises a carousel base with a plurality of rack spacers attached to the upper surface of the carousel base. Each of the plurality of rack spacers extend upward from the upper surface of the carousel base. Adjacent rack spacers define a rack slot into which a slide rack is positioned such that slide rack rests on a portion of the upper surface of the base. Glass slides occupy various slots in each slide rack. The heights of the various slide racks may vary. Additionally, the scanning apparatus comprises a mount bracket 80 that is positioned above a top surface of each of the plurality of slide racks.

In the illustrated embodiment, each rack spacer comprises a perimeter edge extending upward from the base proximal the perimeter edge of the base. Each of the perimeter edges has a hand recess that is configured to allow a hand of an operator (or a gripper mechanism of an automation device) to access a rack slot defined in part by the rack spacer. When accessing a rack slot, the operator may insert a slide rack to or remove a slide rack from the slide rack carousel. The perimeter edge also has an upper portion and a lower portion. Advantageously the upper portion and the lower portion of the perimeter edge are positioned at the same angle, θ°, as the offset transmitter 90 and receiver 95 pair such that the safety light curtain formed by the transmitter 90 and receiver 95 pair is the same distance from the exterior surface of the upper portion and the lower portion of the perimeter edge.

In the illustrated embodiment, a plurality of transmitter/receiver pairs are positioned with one of a transmitter 90 or receiver 95 in the mount bracket 80 and a corresponding one of the transmitter 90 or receiver 95 in the machine base. Advantageously, each light curtain 100 formed by a transmitter and receiver pair is substantially the same distance from the end of each glass slide in the slide rack or from the exterior surface of the upper portion and the lower portion of the perimeter edge.

Figure 6:
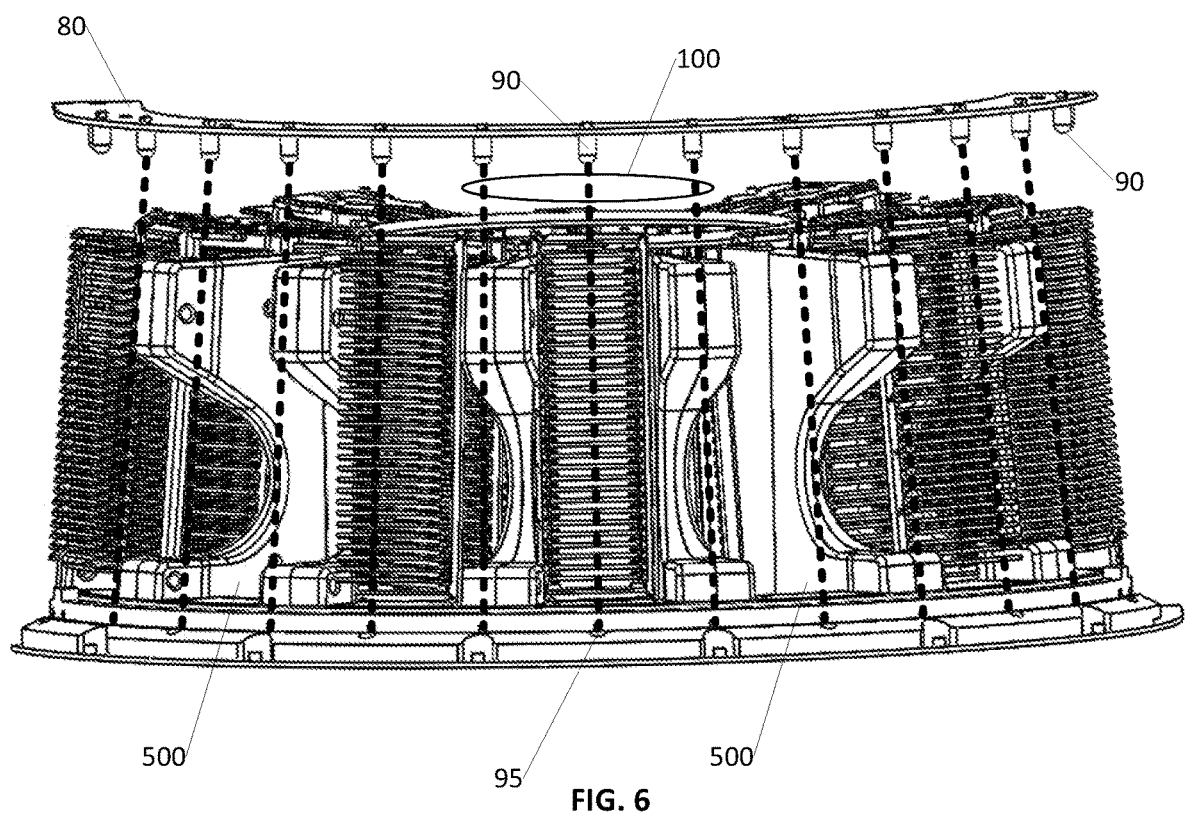
FIG. 6 is a perspective view diagram illustrating an example digital pathology scanning apparatus with a safety light curtain protecting a slide rack carousel according to an embodiment.

FIG. 6 is a perspective view diagram illustrating an example digital pathology scanning apparatus with a safety light curtain 100 protecting a slide rack carousel according to an embodiment. In the illustrated embodiment, the safety light curtain 100 comprises a plurality of direct wireless links 100, where each link 100 is between a transmitter 90 and receiver 95 pair. The transmitter and receiver pair may use any of a variety of direct wireless links such as an infrared light beam, a visible light beam, an ultraviolet light beam, or a LASER light beam, just to name a few. The transmitter 90 and receiver 95 pair operates by sending a light beam from the transmitter 90 to a photoelectric cell in the receiver 95. Each direct wireless link is positioned at a perimeter of a slide rack spacer or at a perimeter of a slide rack. If a direct wireless link is interrupted during a rotation operation of the slide rack carousel, a processor that monitors the status of the plurality of direct wireless links is configured to disable rotation of the slide rack carousel. As previously described, the process may implement a hard disable or a soft disable of the movement of the slide rack carousel.

Advantageously, the transmitter and receiver pair is communicatively coupled via a direct wireless link and is configured to detect the presence of an object by interruption of the direct wireless link. In one embodiment, the transmitter and receiver pair is monitored by at least one processor of the digital slide scanning apparatus such that interruption of the direct wireless link between the two portions of the transmitter and receiver pair results in an indication to the at least one processor that an object has been detected. When such an indication is present, the at least one processor is configured to disable rotation of the carousel. Additionally, when such an indication is not present, the at least one processor is configured to enable rotation of the carousel.

3. EXAMPLE EMBODIMENTS

In one embodiment, a digital slide scanning apparatus comprises a carousel that includes a carousel base that is configured to support a plurality of slide racks, the carousel base having an upper surface, a lower surface and a perimeter edge. Additionally, at least a portion of the upper surface of the carousel base angles downward from an external region of the carousel base toward a central region of the carousel base. The carousel also includes a plurality of rack spacers extending upward from the base, wherein adjacent pairs of rack spacers define a rack slot bordered on three sides by the base, a first side of a first rack spacer and a second side of a second rack spacer. The digital slide scanning apparatus also includes a mount bracket that is positioned above at least a perimeter portion of the carousel, the mount bracket having an upper surface, a lower surface and a perimeter edge. The mount bracket may include a printed circuit board.

The digital slide scanning apparatus also includes a transmitter and receiver pair, wherein one of the transmitter or receiver is positioned on or in the lower surface of the mount bracket near the perimeter edge of the mount bracket and the other of the transmitter or receiver is positioned on or in the upper surface of the machine base near the perimeter edge of the carousel base. Advantageously, the transmitter and receiver are communicatively coupled via a direct wireless link and the transmitter and receiver pair are configured to detect the presence of an object by interruption of the direct wireless link. A processor monitors a signal from the transmitter and receiver pair to detect an interruption of the direct wireless link.

The digital slide scanning apparatus also includes a housing having an opening that is configured to expose at least a portion of the carousel for continuous loading and unloading of slide racks. The digital slide scanning apparatus also includes at least one processor that is configured to rotate the carousel 360 degrees in either direction and is further configured to receive an indication from any of the transmitter and receiver pairs when the presence of an object is detected. When such an indication is received, the at least one processor is configured to disable rotation of the carousel in response to the indication. Additionally, in response to the termination of such an indication, the at least one processor is configured to enable rotation of the carousel.

In one embodiment, the transmitter and receiver of each transmitter and receiver pair are not vertically aligned but are instead offset at an angle. In one embodiment, the offset angle is equal to the angle of the upper surface of the base.

In one embodiment, a carousel of a digital slide scanning apparatus comprises a base configured to support a plurality of slide racks, the base having an upper surface, a lower surface and a perimeter edge, the base further configured to be rotated 360 degrees in either direction under control of at least one processor of the digital slide scanning apparatus. The carousel also includes a plurality of rack spacers extending upward from the base, wherein adjacent pairs of rack spacers define a rack slot bordered on three sides by the base, a first side of a first rack spacer and a second side of a second rack spacer. In this embodiment, each rack spacer comprises a perimeter edge extending upward from the base proximal the perimeter edge of the base where the perimeter edge has a recess that is configured to allow a hand of an operator (or a gripper mechanism of an automation device) to access a rack slot defined in part by the rack spacer. The recess of each rack spacer has an upper portion and a lower portion positioned in a plane that is substantially parallel to the plane of a direct wireless link between a corresponding transmitter and receiver pair.

The transmitter and receiver pair corresponding to each rack spacer has one of the transmitter or receiver positioned in the mount bracket and the other of the transmitter or receiver positioned in the machine base. The transmitter and receiver pair are communicatively coupled via a direct wireless link and are configured to detect the presence of an object by interruption of the direct wireless link.

Additionally, the at least one processor of the digital slide scanning apparatus is configured to receive an indication from a first transmitter and receiver pair when the presence of an object in a first rack spacer recess occupied by first transmitter and receiver pair is detected by the first transmitter and receiver pair. In response to receiving the indication, the at least one processor of the digital slide scanning apparatus is configured to disable rotation of the base. Additionally, in response to the termination of such an indication, the at least one processor is configured to enable rotation of the base.

4. EXAMPLE DIGITAL SLIDE SCANNING SYSTEM

The various embodiments described herein may be implemented using a digital pathology scanning device such as described with respect to FIGS. 7A-7D.

Figure 7A:
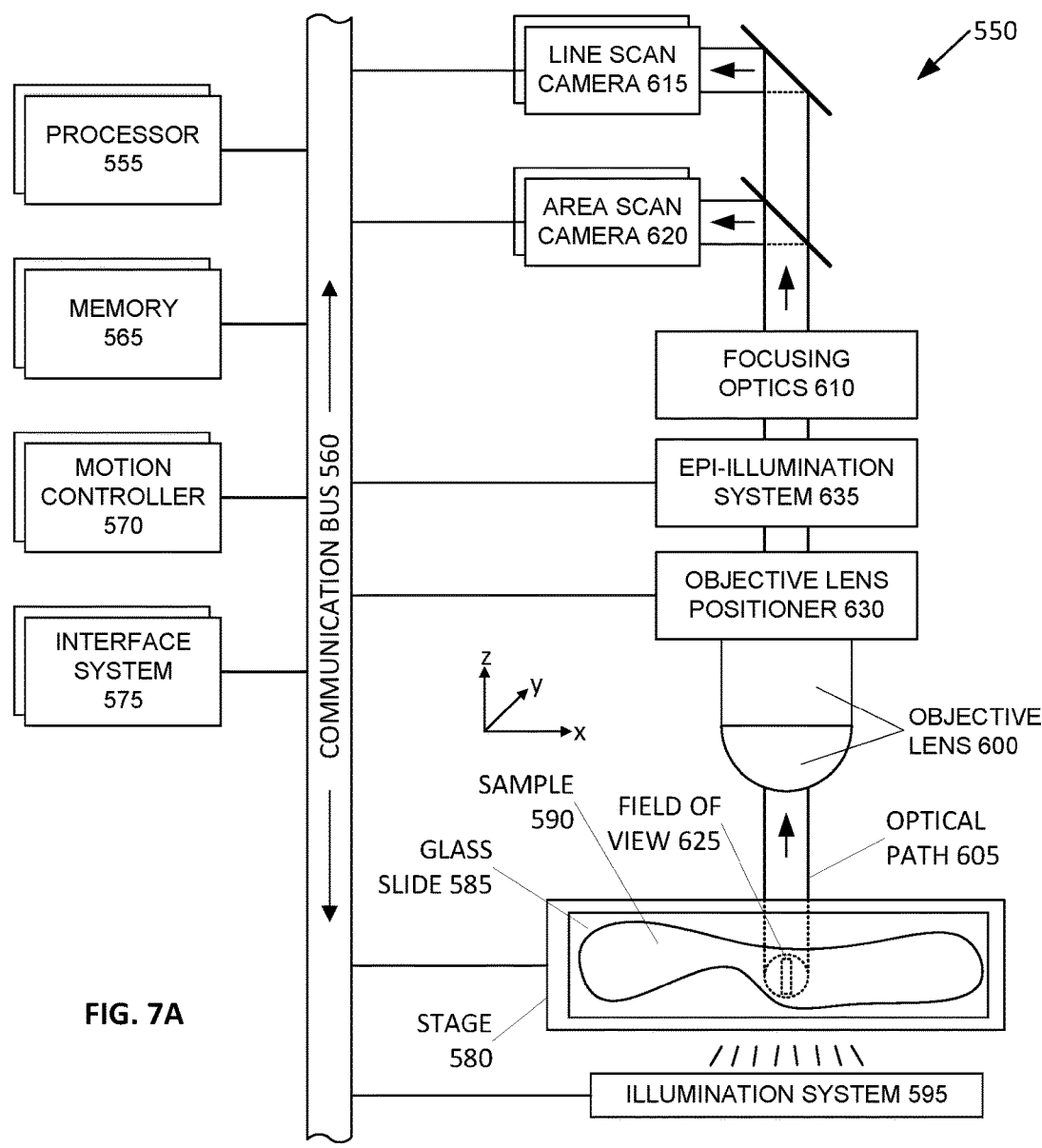
FIG. 7A is a block diagram illustrating an example processor enabled device 550 that may be used in connection with various embodiments described herein.

FIG. 7A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system or a digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated X-Y grid to aid in the location of the sample 590 on the movable stage 580. In an embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20X objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion of the sample 590 or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 7B:
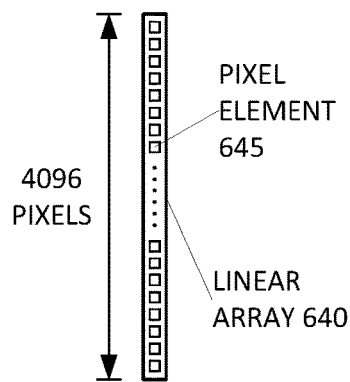
FIG. 7B is a block diagram illustrating an example line scan camera having a single linear array.

FIG. 7B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 7C:
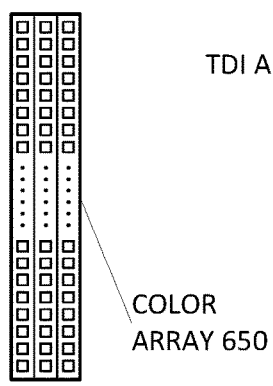
FIG. 7C is a block diagram illustrating an example line scan camera having three linear arrays.

FIG. 7C illustrates a line scan camera having three linear arrays, each of which may be implemented as a CCD array. The three linear arrays combine to form a color array 650. In an embodiment, each individual linear array in the color array 650 detects a different color intensity, (e.g., red, green, or blue). The color image data from each individual linear array in the color array 650 is combined to form a single field of view 625 of color image data.

Figure 7D:
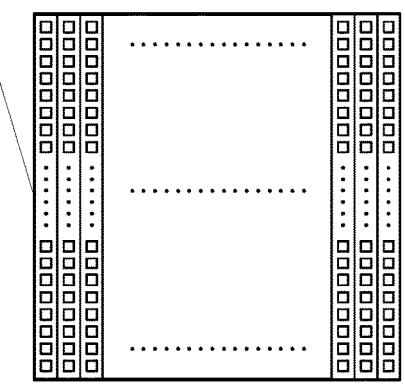
FIG. 7D is a block diagram illustrating an example line scan camera having a plurality of linear arrays.

FIG. 7D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus comprising:
   a carousel supported on a machine base, wherein the carousel comprises
      a carousel base configured to be rotated 360 degrees, and
      a plurality of rack spacers extending upward from the carousel base, wherein each adjacent pair of the plurality of rack spacers defines a rack slot;
   a plurality of transmitter and receiver pairs, wherein, for each of the plurality of transmitter and receiver pairs, one of the transmitter or receiver is attached to the machine base, the other one of the transmitter or receiver is attached to a mount bracket positioned above the carousel, and the transmitter and receiver are communicatively coupled via a direct wireless link; and
   at least one processor configured to
      monitor the direct wireless link, and
      disable rotation of the carousel base in response detecting an interruption in the direct wireless link.

2. The digital slide scanning apparatus of claim 1, wherein each of the plurality of rack spacers comprises a perimeter edge extending upward from the carousel base, and wherein each perimeter edge comprises a recess.

3. The digital slide scanning apparatus of claim 1, further comprising a housing that houses the machine base, the carousel, the mount bracket, and the plurality of transmitter and receiver pairs, wherein the housing comprises an opening that exposes a portion of the carousel to an exterior of the housing.

4. The digital slide scanning apparatus of claim 3, wherein the exposed portion of the carousel comprises a plurality of rack slots.

5. The digital slide scanning apparatus of claim 1, wherein disabling rotation of the carousel base comprises:
determining whether or not the interruption is within a predefined distance from an edge of the opening in the housing;
when determining that the interruption is within the predefined distance, performing a hard disable in which the carousel base is immediately stopped; and,
when determining that the interruption is not within the predefined distance, performing a soft disable in which the carousel base is stopped at a next indexed position.

6. The digital slide scanning apparatus of claim 1, wherein the at least one processor is configured to disable rotation of the carousel base by performing a hard disable in which the carousel base is immediately stopped.

7. The digital slide scanning apparatus of claim 1, wherein the at least one processor is configured to disable rotation of the carousel base by performing a soft disable in which the carousel base is stopped at a next indexed position.

8. The digital slide scanning apparatus of claim 1, wherein the at least one processor is further configured to enable rotation of the carousel base, when the interruption is no longer detected after disabling rotation of the carousel base.

9. The digital slide scanning apparatus of claim 1, wherein the carousel base is circular.

10. The digital slide scanning apparatus of claim 1, wherein the carousel base comprises a flat portion, and an angled portion that is angled downward at an angle $\theta$ with respect to the flat portion.

11. The digital slide scanning apparatus of claim 10, wherein, in each of the plurality of transmitter and receiver pairs, the transmitter and receiver are offset at the angle $\theta$ with respect to a vertical axis.

12. The digital slide scanning apparatus of claim 10, wherein each of the plurality of rack spacers comprises a perimeter edge comprising an upper portion and a lower portion, and wherein the upper portion and the lower portion of each perimeter edge extend at the angle $\theta$ with respect to the vertical axis.

13. The digital slide scanning apparatus of claim 1, wherein the direct wireless link uses a light beam.

14. The digital slide scanning apparatus of claim 13, wherein the direct wireless link uses a pulsed light beam.

15. The digital slide scanning apparatus of claim 13, wherein the light beam is an infrared light beam.

16. The digital slide scanning apparatus of claim 13, wherein the light beam is an ultraviolet light beam.

17. The digital slide scanning apparatus of claim 13, wherein the light beam is a laser light beam.

18. The digital slide scanning apparatus of claim 1, further comprising, for each of the plurality of transmitter and receiver pairs, a riser apparatus attached to the machine base, wherein the riser apparatus comprises a light guide positioned in front of the one of the transmitter or receiver that is attached to the machine base, and wherein the light guide is configured to focus light from the transmitter onto the receiver.

19. The digital slide scanning apparatus of claim 1, wherein the at least one processor is configured to rotate the carousel base in two directions.

20. A method comprising using at least one processor in a digital slide scanning apparatus to:
monitor a direct wireless link between a plurality of transmitter and receiver pairs; and
disable rotation of a carousel base in the digital slide scanning apparatus in response to detecting an interruption in the direct wireless link.

* * * * *